US008144629B2

(12) United States Patent
Chamas et al.

(10) Patent No.: US 8,144,629 B2
(45) Date of Patent: *Mar. 27, 2012

(54) ADMISSION CONTROL FOR SERVICES

(75) Inventors: Haidar Chamas, White Plains, NY (US); William A. Bjorkman, Danbury, CT (US)

(73) Assignee: Verizon Services Corp., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/796,347

(22) Filed: Jun. 8, 2010

(65) Prior Publication Data

US 2010/0246393 A1 Sep. 30, 2010

Related U.S. Application Data

(63) Continuation of application No. 11/191,582, filed on Jul. 28, 2005, now Pat. No. 7,760,738.

(51) Int. Cl.
*H04L 12/28* (2006.01)
*H04L 12/26* (2006.01)
*G06F 15/173* (2006.01)

(52) U.S. Cl. .................. 370/256; 370/392.21; 370/238; 370/232; 370/351; 709/241

(58) Field of Classification Search .................. 370/230, 370/238, 395.21, 395.3, 254, 255, 256, 351, 370/352, 468, 232, 412; 709/241
See application file for complete search history.

(56) References Cited

U.S. PATENT DOCUMENTS

| 5,583,860 | A | 12/1996 | Iwakawa et al. |
| 5,781,624 | A | 7/1998 | Mitra et al. |
| 5,995,503 | A | 11/1999 | Crawley et al. |
| 6,301,244 | B1 | 10/2001 | Huang et al. |
| 6,594,268 | B1 * | 7/2003 | Aukia et al. ............... 370/400 |
| 6,778,535 | B1 * | 8/2004 | Ash et al. ............... 370/395.21 |
| 6,813,272 | B1 | 11/2004 | An et al. |

(Continued)

OTHER PUBLICATIONS

Part 3: Media Access Control (MAC) Bridges-Amendment 2: Rapid Reconfiguration, IEEE Standard for Local and Metropolitan Area Networks Common Specifications; Part 3: Media Access Control (MAC) Bridges-Amendment 2: Rapid Reconfiguration; Approved Jun. 14, 2001 IEEE-SA Standards Board; Approved Oct. 25, 2001 American National Stand, IEEE Standard for Local and Metropolitan Area Networks Common Specifications; Part. 3: Media Access Control (MAC) Bridges-Amendment 2: Rapid Reconfiguration; Approved Jun. 14, 2001 IEEE-SA Standards Board; Approved Oct. 25, 2001 American National Stand. Oct. 25, 2001.

(Continued)

*Primary Examiner* — Kwang B Yao
*Assistant Examiner* — Candal Elpenord

(57) ABSTRACT

An admission control system is disclosed in combination with a network and a computing system in communication with the network. The computing system is configured to determine a class of service requirement from a service request. The computing system is furnished with topology information about the network, a portion of the topology being based on a protocol (e.g., Multiple Spanning Tree protocol) whereby multiple paths are created for provisioning a connection for the service request. A mechanism is configured to determine if at least one path is available that satisfies the class of service requirement and to admit the service request into the network when the path is available for provisioning the connection. Bandwidth usage may be tracked and used in provisioning decisions. Requests may be made to the network to add bandwidth (e.g., through additional optical wavelengths) to accommodate service requests.

26 Claims, 6 Drawing Sheets

U.S. PATENT DOCUMENTS

| | | | |
|---|---|---|---|
| 6,826,184 B1 * | 11/2004 | Bryenton et al. | 370/395.21 |
| 6,912,232 B1 | 6/2005 | Duffield et al. | |
| 6,963,927 B1 | 11/2005 | Lee et al. | |
| 7,002,917 B1 | 2/2006 | Saleh | |
| 7,130,262 B1 | 10/2006 | Cortez et al. | |
| 7,366,109 B2 * | 4/2008 | Ashwood-Smith | 370/254 |
| 7,385,982 B2 | 6/2008 | Warden et al. | |
| 7,602,807 B2 | 10/2009 | Zadikian et al. | |
| 7,756,039 B2 * | 7/2010 | Yonge et al. | 370/235 |
| 2003/0147400 A1 * | 8/2003 | Devi | 370/395.21 |
| 2004/0081171 A1 | 4/2004 | Finn | |
| 2004/0105446 A1 * | 6/2004 | Park et al. | 370/395.21 |
| 2005/0025059 A1 * | 2/2005 | Rajan et al. | 370/238 |
| 2005/0063321 A1 | 3/2005 | Imai | |
| 2005/0149625 A1 * | 7/2005 | Rouyer et al. | 709/220 |
| 2005/0157750 A1 | 7/2005 | Rabie et al. | |
| 2005/0220148 A1 | 10/2005 | DelRegno et al. | |
| 2006/0002417 A1 * | 1/2006 | Yucel | 370/437 |
| 2006/0182037 A1 * | 8/2006 | Chen et al. | 370/252 |
| 2007/0036161 A1 | 2/2007 | Mahamuni | |
| 2007/0115918 A1 * | 5/2007 | Bodin et al. | 370/352 |

OTHER PUBLICATIONS

Technical Specification MEF 6, Metro Ethernet Forum; Technical Specification MEF 6; Ethernet Services Definitions—Phase I; Jun. 2004., Metro Ethernet Forum; Technical Specification MEF 6; Ethernet Services Definitions—Phase I; Jun. 2004.

"Telecommunications and Information Exchange Between Systems", ANSI/IEEE Standard 802.1 D, 1998 Edition; IEEE Standard for Information Technology—Telecommunications and Information Exchange Between Systems—Local and Metropolitan Area Networks—Adopted by the ISO/IEC & Redesignated as ISO/IEC 15802-3: 1998., ANSI/IEEE Standard 802.1 D, 1998 Edition; IEEE Standard for Information Technology—Telecommunications and Information Exchange Between Systems—Local and Metropolitan Area Networks—Adopted by the ISO/IEC & Redesignated as ISO/IEC 15802-3: 1998.

"Telecommunications and Information Exchange Between Systems", IEEE Standard 802.Mar. 2002; IEEE Standard for Information Technology—Telecommunications and Information Exchange Between Systems—Local and Metropolitan Area Networks—Mar. 8, 2002., IEEE Standard 802.Mar. 2002; IEEE Standard for Information Technology—Telecommunications and Information Exchange Between Systems—Local and Metropolitan Area Networks—Mar. 8, 2002.

"Virtual Bridged Local Area Networks", IEEE Standard 802. 10; IEEE Standards for Local and Metropolitan Area Networks; Virtual Bridged Local Area Networks, pp. 1-312, May 7, 2003., IEEE Standard 802. 10; IEEE Standards for Local and Metropolitan Area Networks; Virtual Bridged Local Area Networks, pp. 1-312, May 7, 2003.

"Virtual Bridged Local Area Networks", IEEE Standard 802. 1s; IEEE Standards for Local and Metropolitan Area Networks; Virtual Bridged Local Area Networks—Amendment 3: Multiple Spanning Trees; Dec. 31, 2002., IEEE Standard 802. 1s: IEEE Standards for Local and Metropolitan Area Networks; Virtual Bridged Local Area Networks—Amendment 3: Multiple Spanning Trees; Dec. 31, 2002.

IEEE, et al., "Part 3: Carrier sense multiple access with .collision detection (CSMAICI:?) access method and physical layer specifications", IEEE Standard for Information technology—Telecommunications and information exchange between systems—Local and metropolitan area networksSpecific requirements.

Pandey, et al., "Quality of Service Support Over Switched Ethernet", Quality of Service Support Over Switched Ethernet; Aparna Pandey and H.M. Alnuweiri; Department of Electrical and Computer Engineering; University of British Columbia, Vancouver B.C., pp. 353-356, Feb. 1999., Quality of Service Support Over Switched Ethernet; Aparna Pandey and H.M. Alnuweiri; Department of Electrical and Computer Engineering; University of British Columbia, Vancouver B.C., pp. 353-356, Feb. 1999., 353-356.

Sharma, et al., "Viking; A Multi-Spanning-Tree Ethernet Architecture for Metropolitan Area and Cluster Networks", Sharma, et al., "Viking; A Multi-Spanning-Tree Ethernet Architecture for Metropolitan Area and Cluster Networks", Department of Computer Science, Stony Brook U. & FL State U., pp. 2283-2294, Sep. 2004., Sharma, et al., "Viking: A Multi-Spanning-Tree Ethernet Architecture for Metropolitan Area and Cluster Networks", Department of Computer Science, Stony Brook U. & FL State U., pp. 2283-2294, Sep. 2004.

Stalling S, William , "LAN QoS", The Internet Protocol Journal—Cisco Systems; LAN QoS by William Stallings; 2000., The Internet Protocol Journal—Cisco Systems; LAN QoS by William Stallings; 2000., 1-8.

* cited by examiner

ADMISSION CONTROL FOR SERVICES

CROSS REFERENCE TO RELATED APPLICATIONS

This application is a continuation of U.S. patent application Ser. No. 11/191,582, filed on Jul. 28, 2005, which is hereby incorporated by reference in its entirety.

BACKGROUND INFORMATION

A Local Area Network (LAN) is a communication network (or enables computers attached to a network) that spans a relatively small geographic region. Most LANs are confined to a single building or group of buildings. However, one LAN can be connected to one or more other LANs via land-lines or radio waves. A system of LANs connected in this way is called a Wide Area Network (WAN).

Ethernet is presently considered a dominant LAN technology. As a result, a substantial level of the total data traffic associated with LANS terminates at an Ethernet port. There is a continuous demand for ever-faster networking speeds. Ethernet technology is meeting this demand through a combination of modifications and enhancements. For example, Ethernet technology has evolved from a half-duplex shared media at a speed of 10 Mbps in the LAN, to a full-duplex switched 10/100/1000/10000 Mbps in the LAN and Metro Area Networks (MAN). In the near-future, 40 to 100 Gigabit Ethernet speeds are expected to be reached on core backbone links.

Despite these advances, however, Ethernet technology is not presently mature for use in a service provider environment. A service provider offers its Ethernet services to a customer over a User to Network Interface (UNI) and builds logical connections called Ethernet virtual connections (EVCs). Specifically, the use of pure Ethernet as a transport medium in the Metro and Wide area networks still faces several key hurdles including end-to-end Quality of Service (QoS) guarantees. QoS refers to the capability of a network to provide better service to selected network traffic over various technologies, such as Frame Relay, Asynchronous Transfer Mode (ATM), and Ethernet. Currently, Ethernet provides best effort traffic delivery based on Spanning Tree Protocol (STP). A best effort traffic delivery system is a system that makes an attempt to forward all datagrams over a network connection although the outcome is not guaranteed. Thus, if the network becomes overloaded or routes change, datagrams can be lost, delayed or delivered out of order. The lack of inherent QoS capabilities of Ethernet raises the critical issue of whether a given request with a specific QoS requirement can be admitted without compromising the service performance of already accepted Ethernet Virtual Connections (EVCs), which have been provisioned with certain guarantees such as committed information rate (CIR) and excess information rate (EIR). To enhance the performance of best effort delivery systems based on STP, Multiple Spanning Tree (MST) protocol can be used to increase the number of paths upon which data can be transmitted through a network. Having more paths available via MST could reduce loss of data due to capacity limitations of the trunk links. More details of STP and MST protocol are provided below.

Class of Service (CoS) is a form of a service definition set by the service provider that provides certain guarantees and performance metrics. CoS can be mapped to priority queues that have been used in a number of communication and networking protocols. CoS classifies packets by examining packet parameters or CoS markings and places packets in queues of different priorities based on predefined criteria. Native Ethernet has no CoS provision and therefore cannot mark packets for prioritization, scheduling, or policing; however, IEEE 802.1Q tags provide the capability to support CoS but has no control protocol to guarantee it. Typically, a service provider provides several classes of service to support different customer applications. Each CoS is distinguished by its performance guarantees such as delay, packet loss and jitter. For example, Gold service class is defined to support packet voice applications and meet their performance objectives (delay, jitter and packet loss).

Further, Ethernet has a major scalability bottleneck due to its use of Spanning Tree Protocol (STP) for routing traffic. STP is a link management protocol that provides path redundancy while preventing undesirable loops in the network. For an Ethernet network to function properly, only one active loop-free path can exist between two stations. Unfortunately, allowing only one path can result in uneven load distribution and potential bottlenecks. To provide path redundancy, STP defines a tree that spans all switches in an extended network. STP forces certain redundant data paths into a standby (blocked) state. If one network segment in the STP becomes unreachable, or if STP costs change, the spanning-tree algorithm reconfigures the spanning-tree topology and reestablishes the link by activating one of the standby paths. Ethernet path establishment via STP could mean that a non-optimal path exists, which could introduce packet loss, jitter, and delay. Multiple Spanning Tree (MST) protocol addresses STP limitations by allowing more links to be utilized in the network. For example, if a first Ethernet path becomes overloaded due to heavy traffic, MST protocol can establish an alternative loop free path upon which datagrams can travel across, which will result in reducing this traffic on the first Ethernet path. Thus, MST protocol can be used to distribute the traffic across the links and enhance the QoS of a network, but it is not CoS aware.

The next generation of Ethernet services will require guarantees of service performance, typically specified in a Service Level Agreement (SLA). Consequently, for Ethernet to evolve as a next generation networking technology that will continue to dominate LAN technologies as well as to have an increasing share of MAN and WAN technologies, it must support QoS and CoS. Thus, there is a need for an admission control system and method that controls EVC admission into a service provider's network and determines the most efficient path through the network in view of CoS as well as QoS requirements.

BRIEF DESCRIPTION OF THE DRAWINGS

The present invention will be more fully understood upon reading the following detailed description of preferred embodiments in conjunction with the accompanying drawings, in which.

DETAILED DESCRIPTION OF PREFERRED EMBODIMENTS

Preferred systems and methods are described herein, these preferred systems and methods are configured to control connection admission into a network and determine the most efficient path through the network based on a Class of Service (CoS) requirement received in a service request. The described embodiments provide a centralized admission control and path selection function for provisioning connections such as Ethernet Virtual Connections (EVCs) in a network such as a multiple spanning tree network. Through the admission control and path selection facilities, CoS requirements can be achieved even in networks such as Ethernet networks that do not support CoS marking for packets.

Figure 1:
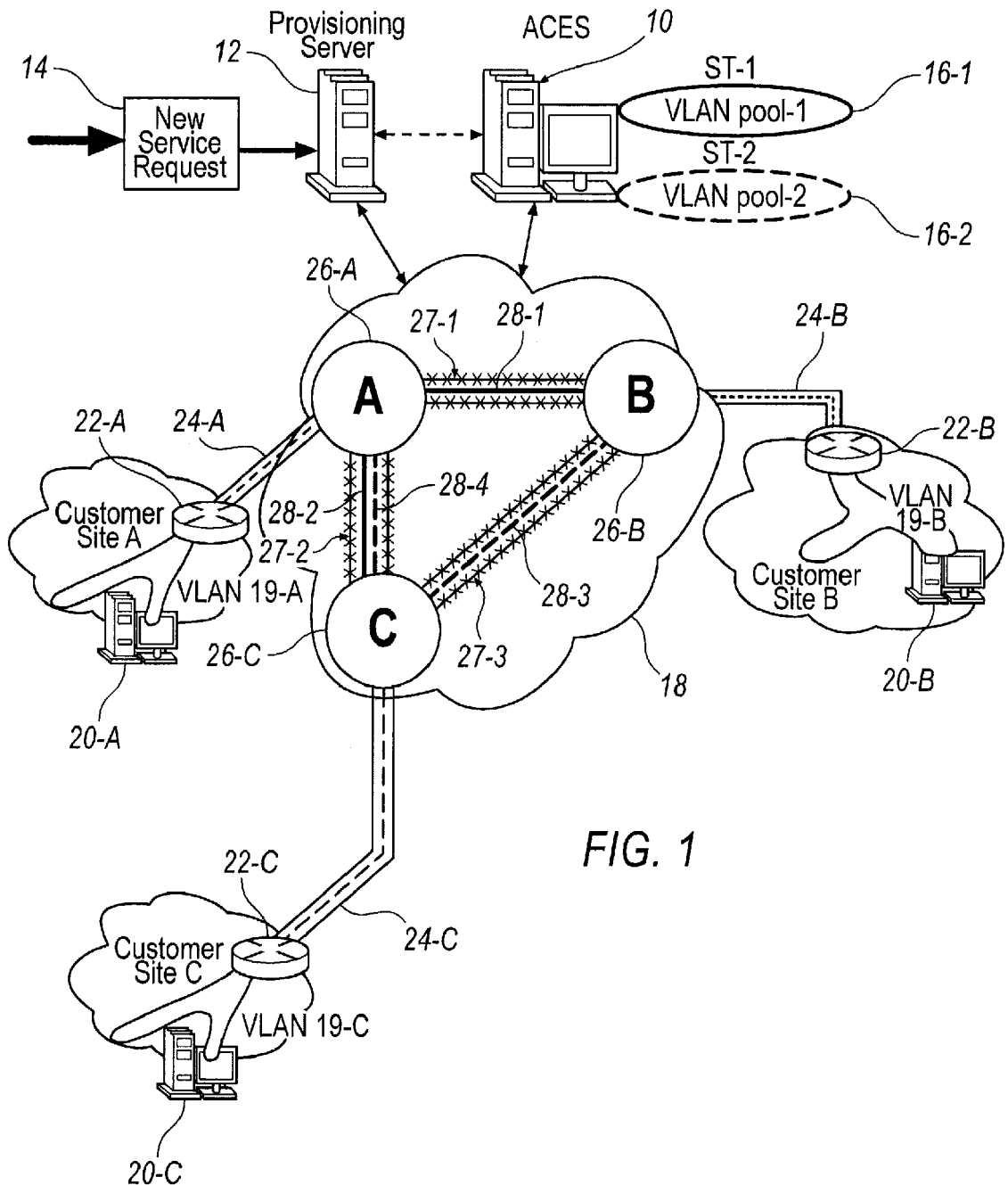
FIG. 1 is an architecture diagram of a network including an embodiment of an admission control for Ethernet services system.

Referencing FIG. 1, in one embodiment an admission control system 10 such as an Admissions Control for Ethernet Services (ACES) system is provided as a host computer or server furnished with a mechanism that is operable to provision connections in a network 18 based on CoS requirements and by using a protocol. If network 18 is a multiple spanning tree network then the protocol may be a Multiple Spanning Tree (MST) protocol. One form of the mechanism that can be used includes application software with one or more heuristics (processes). System 10 may be communicatively coupled to network 18 (e.g., via a network interface) to receive communications from the various elements within and connected to network 18. System 10 may include a processing system (e.g., one or more microprocessor cores), a memory system (e.g., volatile and/or non-volatile memories), an I/O system (including an interface to network 18) and other systems interconnected via busses and other interconnection technologies, as is well known to those of skill in the art. The application software described herein may implement a plurality of instructions and/or data (e.g., stored in the memory system) and be configured to cause the processing system to perform the processes embodied in such application software, as is well known.

The system 10 may be adapted to provide the entire connection provisioning capability for a given network 18, or the system 10 may be adapted to interface with a provisioning server 12 in the case of large scale networks. The provisioning server 12 may be provided as part of the system 10 or as a stand alone unit (with components similar to system 10). The system 10 or provisioning server 12, if provided separately, operates to receive an incoming service request 14 (e.g., via the network interface) that contains detailed information regarding the CoS and bandwidth required for a proposed connection as well as source and destination information. Thereafter, the system 10 determines the requested CoS requirements from the service request 14 and then determines if a path is available in network 18 that can satisfy the requested CoS requirements by accessing current network topology information provided in Virtual Local Area Network (VLAN) pools (16-1, 16-2).

A VLAN is a logical network connectivity of computers that behave as if they are connected to the same wire even though they may be physically located on different segments of a Local Area Network (LAN) or actually on different LANs, as part of a Wide Area Network (WAN), e.g. "VLAN 19" at customer sites "A", "B" and "C". In the illustrated embodiment, system 10 maintains a number of Spanning Tree-VLAN (ST-VLAN) pools, e.g., ST1-VLAN pool-1 (16-1) and ST2-VLAN pool-2 (16-2), which each contain specific information relative to paths that are available in the network 18 that can be used to provision an EVC that satisfies CoS requirements contained in service requests 14 received from "VLAN 19" customer sites "A", "B" and "C". For example, ST1-VLAN pool-1 (16-1) may include information relative to ten paths through the service provider's network 18 that can be used to satisfy a CoS requirement of "Gold" at a bandwidth of 36 Megabits per second (Mbps) and ST2-VLAN pool-2 (16-2) may include reference information relative to twenty paths that can be used to satisfy a CoS requirement of "Silver" at a bandwidth of 26 Mbps wherein "Gold" is considered the highest class and "Silver" is considered to be a class below "Gold". In such case, system 10 can provision up to ten connections that require a "Gold" CoS rating and up to twenty EVCs that require a "Silver" CoS rating for service requests 14 received from the customer sites "A", "B" and "C".

As briefly described above, the system 10 determines the CoS requirements from the service request 14 and then determines if a path is available in network 18 to satisfy the CoS requirements by checking each VLAN pool. If a path is available then the system 10 assigns the service request 14 a connection, such as an EVC in the case of Ethernet networks, corresponding to the path and maps a VLAN Identifier (VLAN ID) to the connection. The VLAN ID allows the system to keep track of the active connections on the service provider's network 18. If the system 10 determines that a path is not available to satisfy the service request 14 then the request is not admitted into network 18 until a path that meets the CoS requirements becomes available.

Still referring to FIG. 1, system 10 facilitates communication in view of CoS requirements from a communication device associated with VLAN 19-A at a first customer site to another communication device associated with VLAN 19-B at a second customer site. For example, from customer site "A" information can be communicated from a first computer 20-A through a router 22-A that connects to network 18 through a communication link 24-A. System 10 ensures that the information from customer site "A" is routed through the network 18 along the proper path selected in view of CoS requirements to communication link 24-B, router 22-B and to a second computer 20-B.

Typically, network 18, particularly if it is a network of a service provider, includes a number of switches (26-A, 26-B, 26-C) that are used to connect VLAN segments at customer sites "A", "B" and "C", respectively. The switches (26-A, 26-B, 26-C) are connected by trunk links (28-1, 28-2, 28-3, 28-4). A trunk link is configured to carry data from any VLAN between switches. In the case of an Ethernet network, the data is in the form of packets (also referred to as "frames").

To ensure that the most efficient path or "shortest" path available in network 18 is provided for a given service request 14, the system 10 maintains a representation of the network topology. In one embodiment the current view of the topology may be in the form of a physical or logical representation.

To perform optimally, when system 10 is an ACES system, the system expects that the logical topology of the network be based on Multiple Spanning Tree (MST) protocol. Conventional Spanning Tree Protocol (STP) networks have limitations that can directly affect the ability of the ACES system 10 to manage network traffic efficiently if CoS requirements are of concern. Referring to FIG. 1, assume that three physical trunk links (28-1, 28-2, 28-3) have the same speed with a cost budget associated with each link (this "cost budget" may represent, e.g., the delay associated with transmissions on the link, and may be assigned by the service provider of network 18 based on knowledge of the characteristics of the link). However, trunk-link 28-2 physical capacity is shared across two logical paths for ST1 (28-2) and for ST2 (28-4). Switch 26-A is designated as root bridge by assigning it a lower bridge ID than switches 26-B and 26-C. Initially, all three switches (26-A, 26-B, 26-C) send control messages claiming to be the root. However, once switches 26-B and 26-C receive Bridge Protocol Data Units (BPDUs) from switch 26-A, then determine that switch 26-A's root-bridge assignment is lower than their bridge ID, they will stop sending control messages. BPDUs are part of the Spanning Tree Protocol that help discover the physical topology and is used to create the logical spanning tree topologies. Switches 26-A, 26-B and 26-C will then build forwarding tables. For example, Switch 26-B will have a path to the root bridge 26-A via trunk link 28-1 at (in this example) "cost 4" and Switch 26-C will have a path to root bridge 26-A via trunk link 28-2 at (in this example) "cost 4". The cost values are based on the cost budget for the associated link, with higher cost values generally indicating slower trunks. Spanning Tree will select a path with the lowest cost to the root bridge from each network node and will block the node's links with the higher costs. For example, a trunk link having a "cost 4" will be blocked as compared to a trunk link having a "cost 2" between the node and the root bridge.

The trunk link 28-3 is unused since both switches (26-B, 26-C) block their trunk link 28-3 interface. Hence, spanning tree switching is formed and data can flow between the switches (26-A, 26-B, 26-C) with no loop in the network. However, because trunk links 28-1 and 28-2 have limited capacity with regard to bandwidth, the quality of service provided to customers during high network traffic is reduced.

MST switching provides the ability to utilize more trunk links in a network where those trunk links were considered blocked based on STP. It is known to those skilled in the art that a service provider's network is configurable with up to 64 maximum Spanning Trees (STs). However, using more than several spanning trees in a small-to-medium network is not preferred due to the configuration complexity.

A service provider can overlay a network's physical topology with a logical topology based on multiple spanning trees and assign connections such as EVCs per MST as needed. The system 10 is furnished with information relative to the network's physical and logical topologies based on MSTs. This information may be provided to the system 10 through the use of a management interface system (not shown) that monitors the status of the physical components of the network or may be manually entered into the system 10 if the network is not very large. In FIG. 1, a first spanning tree (ST-1) is provided by trunk links 28-1 and 28-2 as shown by the solid lines and the solid line representation of VLAN pool-1. A second spanning tree (ST-2) is provided by trunk links 28-3 and 28-4 as shown by the dashed lines and the dashed line representation of VLAN pool-2. In larger networks, the number of spanning trees could be as high as 64.

A root bridge is assigned or determined on a per spanning tree basis. In creating multiple spanning trees, the root selection plays an important role in the speed of tree convergence. The system 10 determines that the second root bridge can be either 26-B or 26-C, and not 26-A, as determined by which one of the switches (26-B, 26-C) has the lowest cost. Through maintaining current views of the topology (either logical or physical or both) of the network 18 based on the MST protocol, in the illustrated embodiment the ACES system 10 determined that switch 26-C has the lowest cost to the network 18. Hence, in the example second ST (ST-2) is shown in dashed lines and utilizes trunk links 28-3 and 28-4. With the introduction of the ACES system 10 into a network that utilizes MST protocol, a service provider will be able to accommodate CoS requirements in its network.

The functions of preferred system 10 include at least a subset of the following: maintaining a current view of the topology of network 18 (physical or logical or both); maintaining trunk link bandwidth availability per Class of Service (CoS); assigning service provider VLAN ID for each EVC from an appropriate VLAN pool; selecting a network path for a given EVC; reconfiguring queue weighting parameters as needed; requesting additional transport bandwidth from the network; and assigning a backup EVC as a redundant path and path failover recovery.

Details of how the system 10 reconfigures queue weighting parameters as needed are described in U.S. Provisional Application Ser. No. 60/637,281 entitled, "Dynamic Bandwidth Queue Allocation", filed Dec. 17, 2004. Details of how the system 10 request additional transport bandwidth from the network are described in U.S. Provisional Application No. 60/635,836 entitled, "System and Method for Policy Based Intelligent Provisioning of Optical Transport Bandwidth", filed Dec. 14, 2004. The subject matter and disclosures contained within these two applications is hereby incorporated by reference in their entireties.

The system 10 maintains trunk link bandwidth availability per CoS by utilizing a mechanism that keeps track of the amount of bandwidth being used by active EVCs and compares it with the maximum amount of bandwidth available for each path in the network. In the illustrated embodiment the mechanism is software code including a heuristic that is associated with system 10. By making the comparison between the amount of bandwidth being used and the maximum amount available, the system 10 can keep track of how much bandwidth is available on each path that can be used to satisfy a service request 14 having a particular CoS requirement.

Figure 2A:
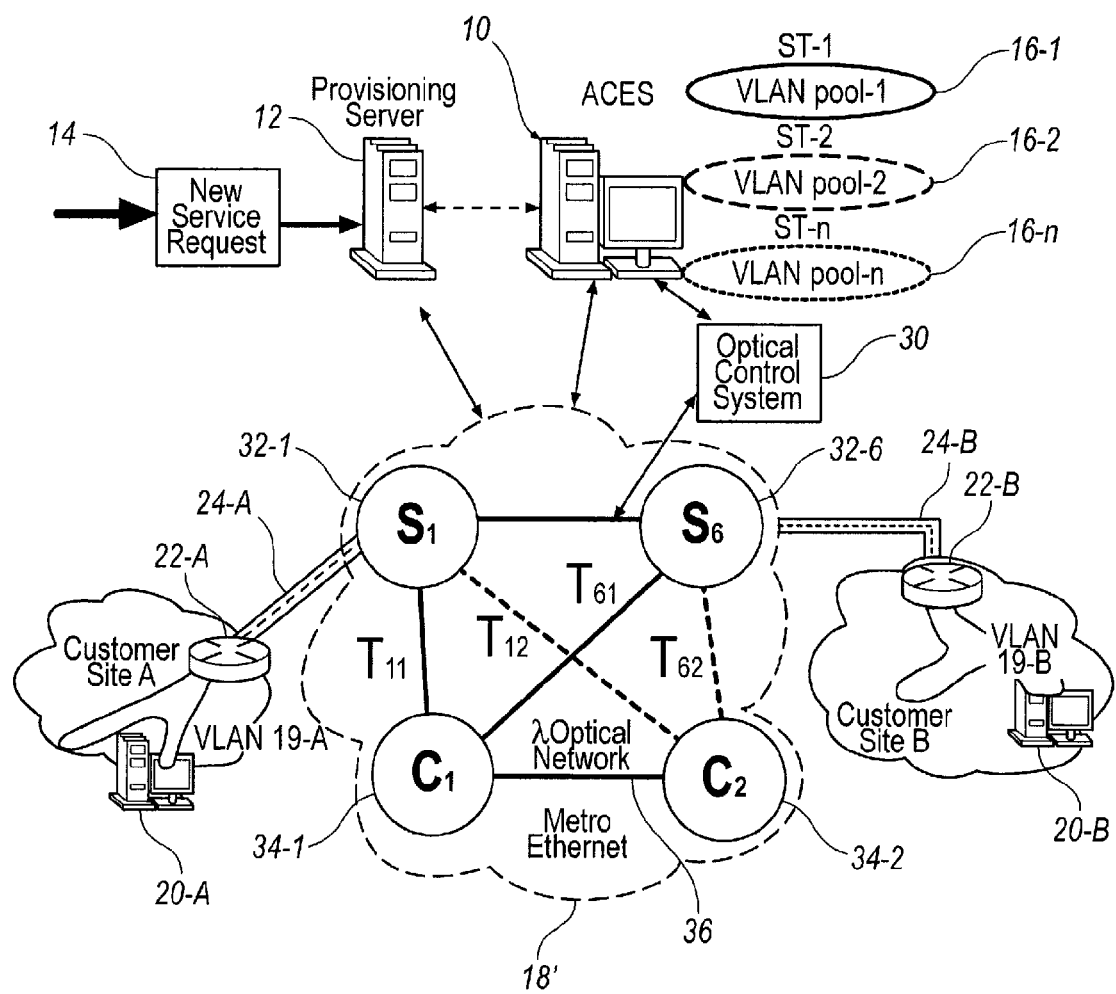
FIG. 2A is an architecture diagram of an optical transport network including a an admission control for Ethernet services system interfacing with a provisioning host computer.
Figure 2B:
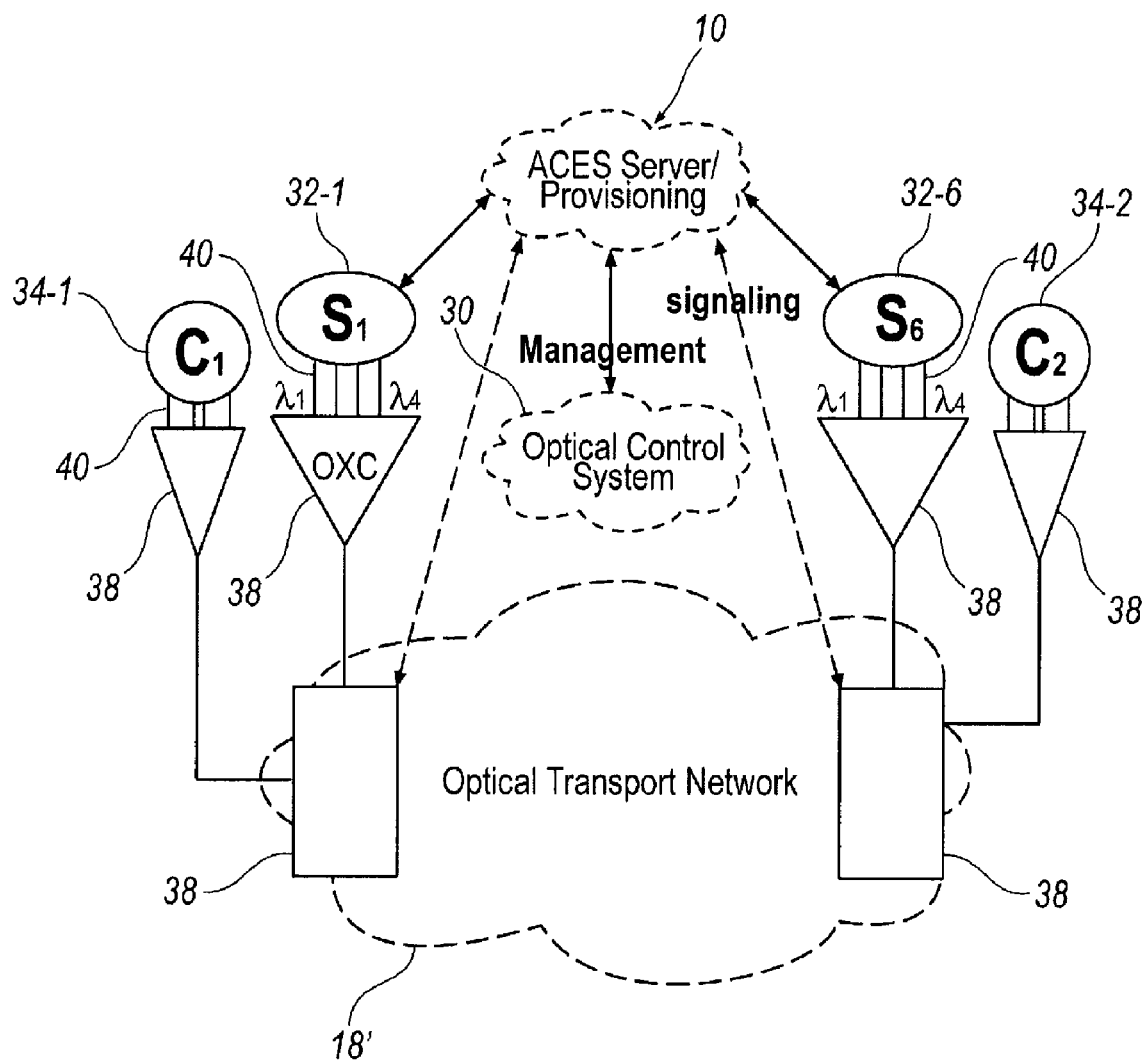
FIG. 2B is a conceptual diagram of the optical transport network of FIG. 2A wherein the embodiment of the admissions control for Ethernet services system includes Ethernet Virtual Connection (EVC) provisioning capabilities.

The system 10 may operate to assign a backup connection as a redundant path to a failed connection by prioritizing the reassignment of the failed connection to an equivalent path that is determined to be available in one of the VLAN pools. Alternatively, at least one spanning tree and associated VLAN pool may be dedicated as backup for a failed EVC connection such that service interruption is minimized ACES for Bandwidth on Demand FIGS. 2A & 2B illustrate the ACES system 10 working closely with a Provisioning Server (PS) 12 and an Optical Control System (OCS) 30 to maximize the network resources of an Optical Transport Network 18' (OTN). FIG. 2A illustrates an architecture diagram of OTN 18' in communication with the ACES system 10 and provisioning server 12 as may be required in the case of large scale networks. FIG. 2B is a conceptual diagram of the optical transport network 18' of FIG. 2A, wherein the ACES system 10 includes EVC provisioning capabilities as well as the ability to communicate directly with optical network elements or with the optical control system. As described above, the system 10 is used in conjunction with the MST protocol to control an EVC's admission into network 18' with the most efficient path selection through the network. In this embodiment, system 10 is configured to send a signal to the OCS to add a wavelength between specific switches when necessary to meet network demand and accommodate additional traffic, FIG. 2A generally illustrates a network with n switches ($S_1 \ldots S_n$) that are multi-homed into m core switches. For simplicity, n=6 and hence only switches 32-1 and 32-6 are illustrated. Also, we chose m=2 and hence each switch (32-1, 32-6) has two trunks dual-horned to two core switches $C_1$ and $C_2$ designated as 34-1 and 34-2, respectively. Each trunk will be represented by the switch number and the core switch number it is connected to, hence $T_{1i}$ represents a trunk from switch $S_1$ to core switch $C_1$, $T_{61}$ represents a trunk from switch $S_6$ to core switch $C_1$, and $T_{12}$ represents a trunk link from switch $S_1$ to switch $C_2$. A core trunk link 36 connects the two core switches (34-1, 34-2). The trunks links ($T_{11}$, $T_{12}$, $T_{61}$, $T_{62}$) are optical trunks switched through the wavelength-based optical transport network 18' and are connected to Optical Cross Connects (OXCs) 38 or NG-SONET ADMs servicing in this embodiment up to eight wavelengths (See FIG. 2B). The OXCs are network devices configured to switch high speed optical signals.

As described above, multiple spanning tree switching provides the ability to utilize more trunk links in a network where those trunk links were considered blocked based on the Spanning Tree Protocol. In the optical network of FIG. 2A, a second spanning tree may be created to utilize the unused trunk links, and when necessary, to meet demand. The ACES system 10 employs switch $C_2$ (34-2) as the second root bridge for the second spanning tree. The second spanning tree is shown in dashed lines in FIG. 2A and utilizes trunk links $T_{12}$ through $T_{62}$. With the introduction of the ACES system 10, a service provider will be able to offer a reliable CoS facility in its network and be able to request that the Optical Control System 30 add bandwidth 40 to a given path between two specific switches to satisfy demand. For example, if the ACES system 10 determines that a service request 14 cannot be satisfied by the bandwidth available on the paths contained the VLAN pools (16-1, 16-2, 16-n) then the system 10 will communicate with the OCS 30 that additional bandwidth 40 is needed along a specific path such that the service request can be satisfied. The OCS 30 determines whether the additional bandwidth 40 is available (e.g., in the form of an additional available wavelength) and, if so, the OCS 30 will add the additional bandwidth 40. The system 10 will then allow the service request 14 to be admitted into the network 18' and provision a path between the appropriate switches and OXCs. It is appreciated that the OCS 30 is limited with regard to how much bandwidth can be added to particular paths by factors such as total available bandwidth (e.g., total number of wavelengths supported over a link) and excess network capacity (e.g., number of wavelengths unused).

Path Selection with ACES, MST and Shortest Path

Figure 3:
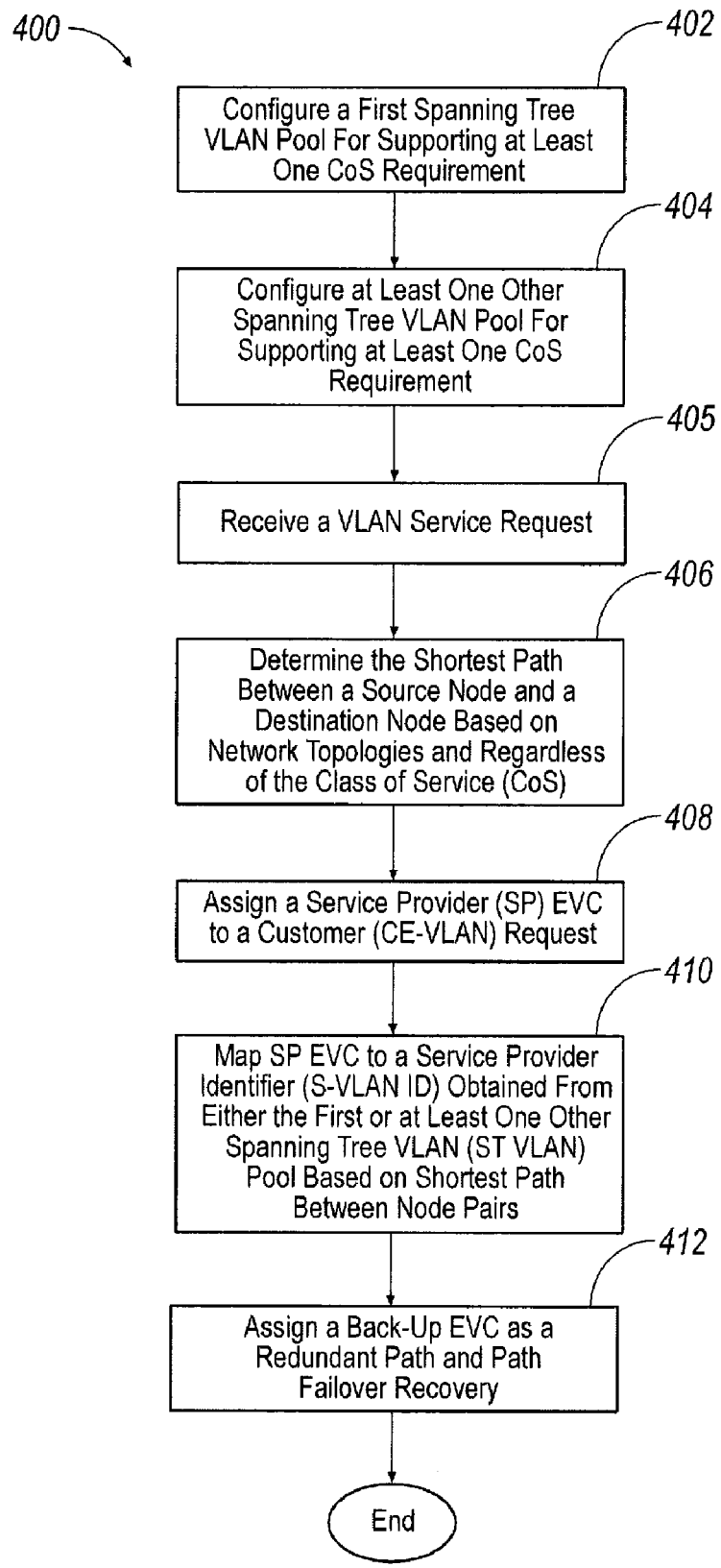
FIG. 3 is a flow diagram of a heuristic for assigning an EVC by choosing the shortest path through the network regardless of Class of Service (CoS)

FIG. 3 illustrates an exemplary mechanism in the form of a heuristic 400 for assigning an EVC by choosing the shortest path through the network regardless of CoS. At step 402, a first sparing tree VLAN pool is configured for supporting at least one CoS requirement. At step 404, at least one other spanning tree VLAN pool for supporting at least one CoS requirement is configured.

At step 405, a VLAN service request is received from a customer, requesting a connection between a source node and a destination node. The service request may include an indication of a desired CoS for the connection, as well as a requested bandwidth for the connection. At step 406, the system determines the shortest path between the source node and the destination node based on network topologies, with no regard to any CoS requirements that may be indicated by the service request. This shortest path determination may use information such as the cost budgets associated with various links along potential paths, as is well known. Continuing the above example, as illustrated in Table 1, VLAN pool-1 may be assigned to connections between node pairs (A, B) and (A, C) and VLAN pool-2 may be assigned to a connection between node pair (B, C). Again, although CoS requirements do not affect the determination of the shortest path, the CoS field appears in Table 1 because, in this example, each service request includes both bandwidth and CoS requirements.

TABLE 1

ACES, MST and Shortest path

| VLAN | Src Node | Dest. Node | CoS | BW Mbps | EVC ID | ST # | VLAN ID |
|---|---|---|---|---|---|---|---|
| 10 | B | C | Bronze | 80 | 1 | ST 2 | Pool-2 2001 |
| 100 | A | B | Gold | 36 | 2 | ST 1 | Pool-1 20 |
| 200 | A | C | Silver | 26 | 3 | ST 1 | Pool-1 21 |

At step 408, an EVC is assigned to a customer VLAN service request, based on the determined shortest path. At step 410, the EVC is mapped to a service provider identifier obtained from the first, or the at least one other, spanning tree VLAN pool based on the determined shortest path. At step 412, the system assigns a backup EVC as a redundant path and path failover recovery.

Path Selection with ACES, MST, Shortest Path and CoS

Figure 4:
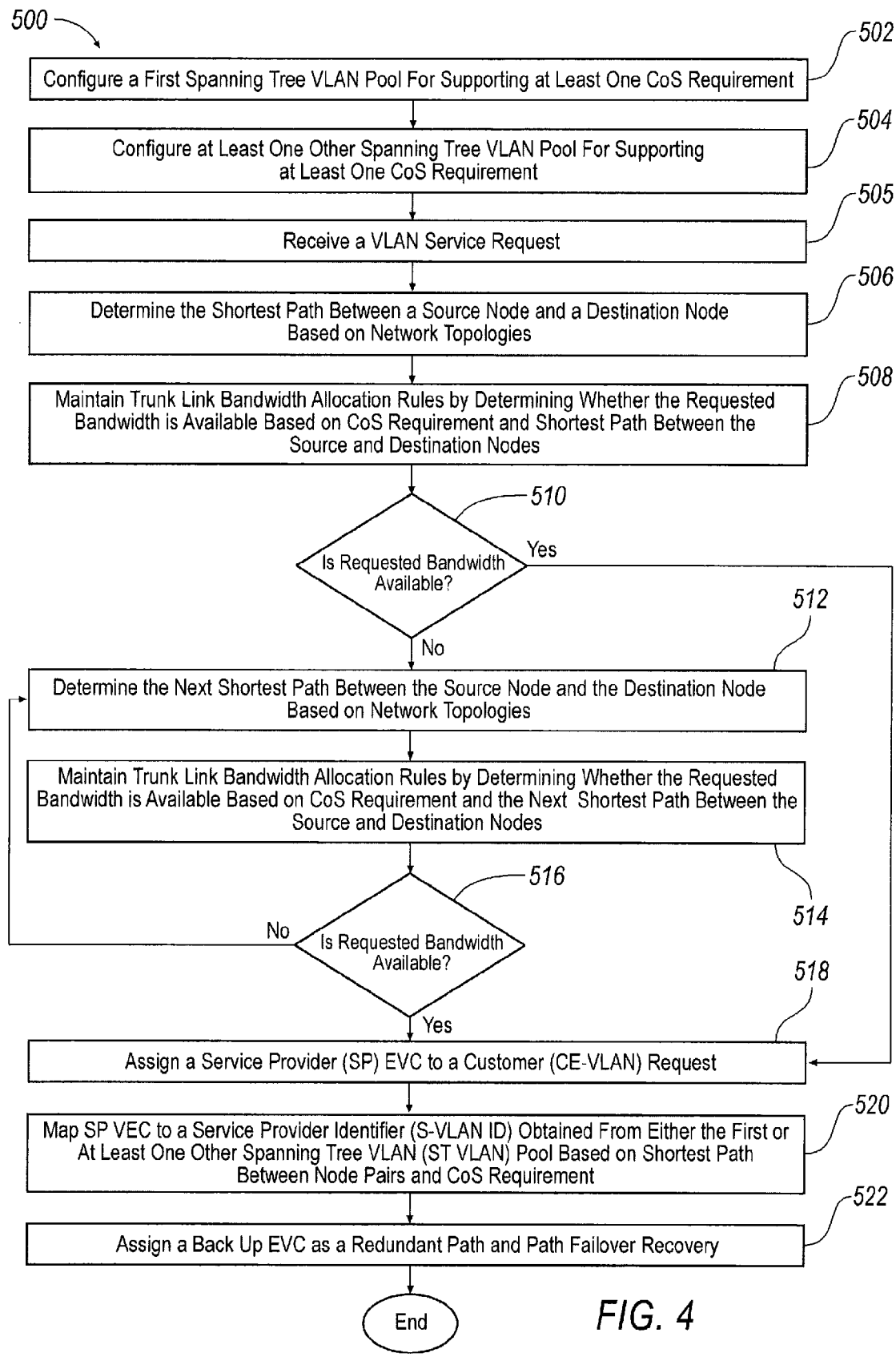
FIG. 4 is a flow diagram of a heuristic for assigning an EVC to the shortest path while maintaining trunk link bandwidth allocation rules in view of each CoS requirement.

FIG. 4 illustrates an exemplary mechanism in the form of a heuristic 500 for assigning an EVC to the shortest path while maintaining trunk link bandwidth allocation rules in view of each CoS requirement. The heuristic 500 includes steps 502-506 that are equivalent to steps 402-406 of heuristic 400. The heuristic 500 includes further steps that consider CoS requirements in path selection. In the event both paths have the same number of hops—then the path with the lowest ST number is chosen.

At step 508, trunk link bandwidth allocation rules are maintained by determining whether the bandwidth requested by the service request is available based on the CoS requirements of the service request and the shortest path between the source and destination nodes identified by the service request. At step 510, the system will check whether the requested bandwidth is available based on the desired service class and the determined shortest path between the source and destination nodes. If the shortest path is not available due to bandwidth limitations then, at step 512, the system determines the next shortest path between the subject nodes and thereafter advances to step 514. If the shortest path is available, then the process advances to step 518 described below.

At step 514, trunk link bandwidth allocation rules are maintained by determining, at step 516, whether the requested bandwidth is available based on the CoS requirements and the determined next shortest path between the source and destination nodes. If bandwidth is available, then the process advances to step 518. If not, then the process returns to step 512 and continues to loop between step 512 and step 516 until either a proper path is available, or all paths are exhausted (in which case the service request may be rejected and the process terminated).

At step 518, an EVC is assigned to the customer VLAN service request. At step 520, the EVC is mapped to a service provider identifier obtained from the first, or the at least one other, spanning tree VLAN pool based on the available shortest path between node pairs and CoS requirements. At step 522, the system assigns a backup EVC as a redundant path and path failover recovery. This option ensures that trunk links are not overloaded and maintains sensitivity to Class of Service requirements and provide fairness across trunk links. Continuing with above example, Table 2 provides an example of EVCs that may be assigned for requests for connections amongst nodes A, B and C, using the process of FIG. 4.

TABLE 2

ACES, MST, Shortest Path and CoS

| VLAN | Src Node 'A' | Dest. Node 'Z' | CoS | BW Mbps | EVC ID | ST # | VLAN ID |
|---|---|---|---|---|---|---|---|
| 10 | B | C | Bronze | 80 | 1 | ST 2 | Pool-2 2001 |
| 100 | A | C | Gold | 36 | 2 | ST 1 | Pool-1 15 |
| 200 | A | C | Silver | 26 | 3 | ST 1 | Pool-1 1025 |

Path Selection with ACES, MST, and CoS in Bandwidth on Demand Optical Network

Figure 5:
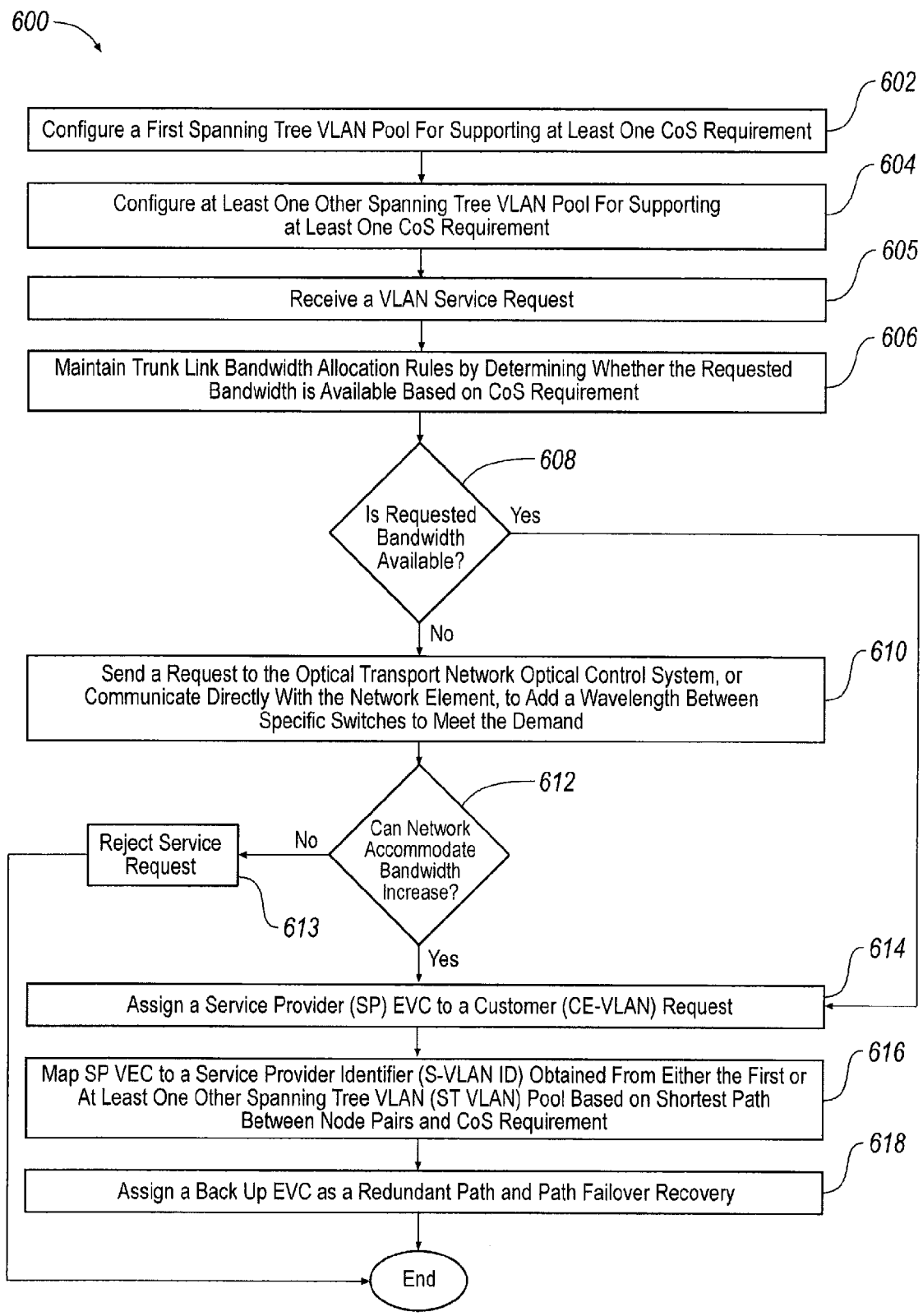
FIG. 5 is a flow diagram of a heuristic for assigning an EVC to an optical link while maintaining trunk link bandwidth allocation rules by determining whether the requested bandwidth is available based on CoS requirements and adding a wavelength between specific switches when necessary to meet demand.

FIG. 5 illustrates an exemplary mechanism in the form of a heuristic 600 for assigning an EVC to an optical link while maintaining trunk link bandwidth allocation rules by determining whether bandwidth requested by a service request is available based on desired CoS requirements, with the option of adding bandwidth between specific switches when necessary to meet demand. At step 602, a first spanning tree VLAN pool is configured for supporting at least one CoS requirement. At step 604, at least one other spanning tree VLAN pool for supporting at least one CoS requirement is configured.

At step 605, a VLAN service request is received from a customer, requesting a connection between a source node and a destination node. The service request includes an indication of a desired CoS and a requested bandwidth for the connection. At step 606, trunk link bandwidth allocation rules are maintained by determining, at step 608, whether the requested bandwidth is available based on the CoS requirements of the service request. For example, if a service request indicates a connection having a Gold CoS and a requested bandwidth of 36 Mbps, it is determined whether one of the paths assigned to service Gold CoS connections can accommodate a 36 Mbps connection. If bandwidth is available, then the process advances to step 614. If not, the process advances to step 610.

At step 610, a request is sent to an entity in or connected to the network—for example, in the example network 18' of FIG. 2A, the request would be sent to the Optical Control System 30—to increase the bandwidth of one or more links along a path, for example, by adding a wavelength between specific switches to meet the demand. At step 612, a determination is made regarding whether or not the network can accommodate the request for increased bandwidth. If the network can accommodate this bandwidth increase, the network allocates the additional bandwidth (e.g., by adding a wavelength along a desired path), and processing advances to step 614. If the network cannot accommodate the request (e.g., the network links involved are operating at maximum capacity), the service request may be rejected at step 613.

At step 614, an EVC is assigned to the customer VLAN service request. At step 616, the EVC is mapped to a service provider identifier obtained from the first, or the at least one other, spanning tree VLAN pool based on CoS requirements. At step 618, the system assigns a backup EVC as a redundant path and path failover recovery.

CONCLUSION

The exemplary systems and methods described above address a need in networks by improving both network resources and utilization with respect to conventional spanning tree networks. ACES, an intelligent provisioning system, used in support of packet services, with the ability to maintain the physical topology and overlay it with a logical topology to determine whether to admit or reject a virtual connection into the network and establish the most efficient EVC path selection based on its CoS requirements in combination with a multiple spanning tree protocol.

In addition, the exemplary systems and methods include the ability to dynamically re-route assigned EVC paths based on higher CoS requirements and real time feedback from active probes within the network. The system also demonstrates efficient utilization of network resources over ST based networks.

The foregoing embodiments of the invention are disclosed for illustrative purposes. Many adaptations and modifications will become apparent to one of ordinary skill in the art upon reading the above descriptions. The scope should be determined with reference to the appended claims, together with the full scope of the equivalents to which such claims are entitled.

What is claimed is:

1. A system, comprising:
a processing system;
a memory system coupled to said processing system; and
a network interface coupled to said processing system and connectable to a network;
wherein said memory system stores instructions configured to cause said processing system, when retrieved from said memory system and executed by said processing system to:
receive a service request over said network interface requesting a connection between a source node and a destination node over said network,
determine a requested class of service associated with said service request, said requested class of service indicating one of a plurality of classes of service requested for said connection,
store topology information about said network in a plurality of virtual local area network pools, a portion of said topology information being based on a protocol identifying multiple paths in said network, each said virtual local area network pool configured to include said topology information relative to a set of paths configured to provision connections satisfying at least one class of service requirement,
determine if a path of said multiple paths is available that is between the source node and the destination node and that satisfies said requested class of service by checking at least a subset of said plurality of virtual local area network pools, and
assign said service request a connection corresponding to said determined path in one of said plurality virtual local area network pools.

2. The system of claim 1, wherein said network is an Ethernet network, and said connection is an Ethernet virtual connection.

3. The system of claim 1, wherein said topology information includes a logical topology.

4. The system of claim 1, wherein said protocol is a multiple spanning tree protocol, and each of said virtual local area network pools includes paths corresponding to a separate spanning tree determined based on said multiple spanning tree protocol.

5. The system of claim 1, wherein said instructions are further configured to cause the processing system to:

determine a shortest path between the source node and the destination node of said multiple paths, and determine if said shortest path satisfies said class of service requirement.

6. The system of claim 1, wherein said instructions are further configured to cause said processing system to selectively map a network identifier to said connection, said network identifier corresponding to said one of said virtual local area network pools including said determined path.

7. The system of claim 1, wherein said instructions are further configured to cause said processing system to assign a backup connection for said connection, said backup connection being a redundant path to said connection.

8. The system of claim 7, wherein said redundant path is included in a different one of said plurality of virtual local area network pools from said one of said virtual local area network pool including said determined path.

9. The system of claim 1, wherein each of said multiple paths is associated with at least one class of service of said plurality of classes of service.

10. The system of claim 9, wherein said service request includes a bandwidth request associated with said connection, and said instructions are further configured to cause said processing system to maintain link bandwidth availability for each of said plurality of classes of service, and determine whether said path is available based on bandwidth availability of said requested class of service as compared to said bandwidth request associated with said connection.

11. The system of claim 1, further comprising an optical control system communicatively coupled to said network and said processing system via said network interface, and wherein said instructions are further configured to cause said processing system to send a request to said optical control system to add wavelength to at least a portion of one of said multiple paths when said one of said multiple paths does not satisfy a bandwidth requirement.

12. The system of claim 1, wherein each of said virtual local area network pools is associated with one of said plurality of classes of service.

13. A method, comprising:

storing topology information about a network based on a multiple spanning tree protocol, the information including a plurality of virtual local area network pools, each virtual local area network pool including a plurality of paths available in the network corresponding to a separate spanning tree determined based on the multiple spanning tree protocol, each of the plurality of paths being capable of being used to provision a connection that satisfies a class of service requirement;

associating at least one first path of the plurality of paths with a first class of service of a plurality of classes of service;

associating at least one second path of the plurality of paths with a second class of service of the plurality of classes of service;

receiving, by a processing device, a service request for a connection over the network between a first node and a second node, the service request including a requested class of service for the connection;

determining, by the processing device, if at least one available path of the plurality of paths exists between the first node and the second node that is associated with the requested class of service by checking at least a subset of said plurality of virtual local area network pools; and assigning the connection to one of the at least one available paths in one of the plurality virtual local area network pools.

14. The method of claim 13, further comprising:

determining a shortest path between the first and second nodes associated with the requested class of service, and assigning the connection to the shortest path.

15. The method of claim 14, further comprising determining a next shortest path between the first node and second node of the plurality of paths when the shortest path does not provide adequate bandwidth based on a bandwidth requirement associated with the service request.

16. The method of claim 13, wherein the connection comprises an Ethernet virtual connection, and further comprising mapping a virtual local area network identifier to the Ethernet virtual connection, the virtual local area network identifier corresponding to the virtual local area network pool including the assigned path.

17. The method of claim 13, further comprising assigning a backup connection for the connection.

18. The method of claim 13, further comprising:

tracking bandwidth usage over the plurality of paths;

determining whether a selected path between the first node and second node of the plurality of paths and associated with the requested class of service provides adequate bandwidth based on a bandwidth requirement associated with the service request; and indicating that the selected path is an available path when the selected path provides adequate bandwidth.

19. The method of claim 18, further comprising sending a request to a network entity requesting additional bandwidth when the selected path does not provide adequate bandwidth.

20. The method of claim 19, further comprising sending the request to an optical control system in communication with the network, the request including a request to add wavelength to at least one network link in the plurality of paths.

21. A non-transitory computer-readable medium tangibly embodying computer-executable instructions configured to cause a processing device to:

store topology information about a network based on a multiple spanning tree protocol, the information including a plurality of virtual local area network pools, each virtual local area network pool including a plurality of paths available in the network corresponding to a separate spanning tree determined based on the multiple spanning tree protocol, each of the plurality of paths being capable of being used to provision a connection that satisfies a class of service requirement;

associate at least one first path of the plurality of paths with a first class of service of a plurality of classes of service;

associate at least one second path of the plurality of paths with a second class of service of the plurality of classes of service;

receive a service request for a connection over the network between a first node and a second node, the service request including a requested class of service for the connection;

determine, by checking at least a subset of said plurality of virtual local area network pools, if at least one available path of the plurality of paths exists between the first node and the second node that is associated with the requested class of service; and assign the connection to one of the at least one available paths included in one of the plurality virtual local area network pools.

22. The computer-readable medium of claim 21, further including instructions configured to cause a processing device to map a network identifier to the connection, the network identifier corresponding to the one of the virtual local area network pools including the one of the at least one available paths.

23. The computer-readable medium of claim 21, further including instructions configured to cause a processing device to:
   determine a shortest path between the source node and the destination node of the at least one available path, and
   determine if the shortest path satisfies the class of service requirement.

24. The computer-readable medium of claim 23, further including instructions configured to cause a processing device to determine a next shortest path between the first node and second node of the plurality of paths when the shortest path does not provide adequate bandwidth based on a bandwidth requirement associated with the service request.

25. The computer-readable medium of claim 21, further including instructions configured to cause a processing device to determine the requested class of service based in part on information regarding bandwidth required for the connection included in the service request.

26. The computer-readable medium of claim 21, further including instructions configured to cause a processing device to assign a backup connection for the connection, the backup connection being a redundant path to the connection and included in a virtual local area network pool dedicated as being a backup for failed connections.

* * * * *